INVENTORS
JOHN L. REHMAN
ROBERT B. LIVERGOOD, JR.
BY Oldham & Oldham
ATTYS

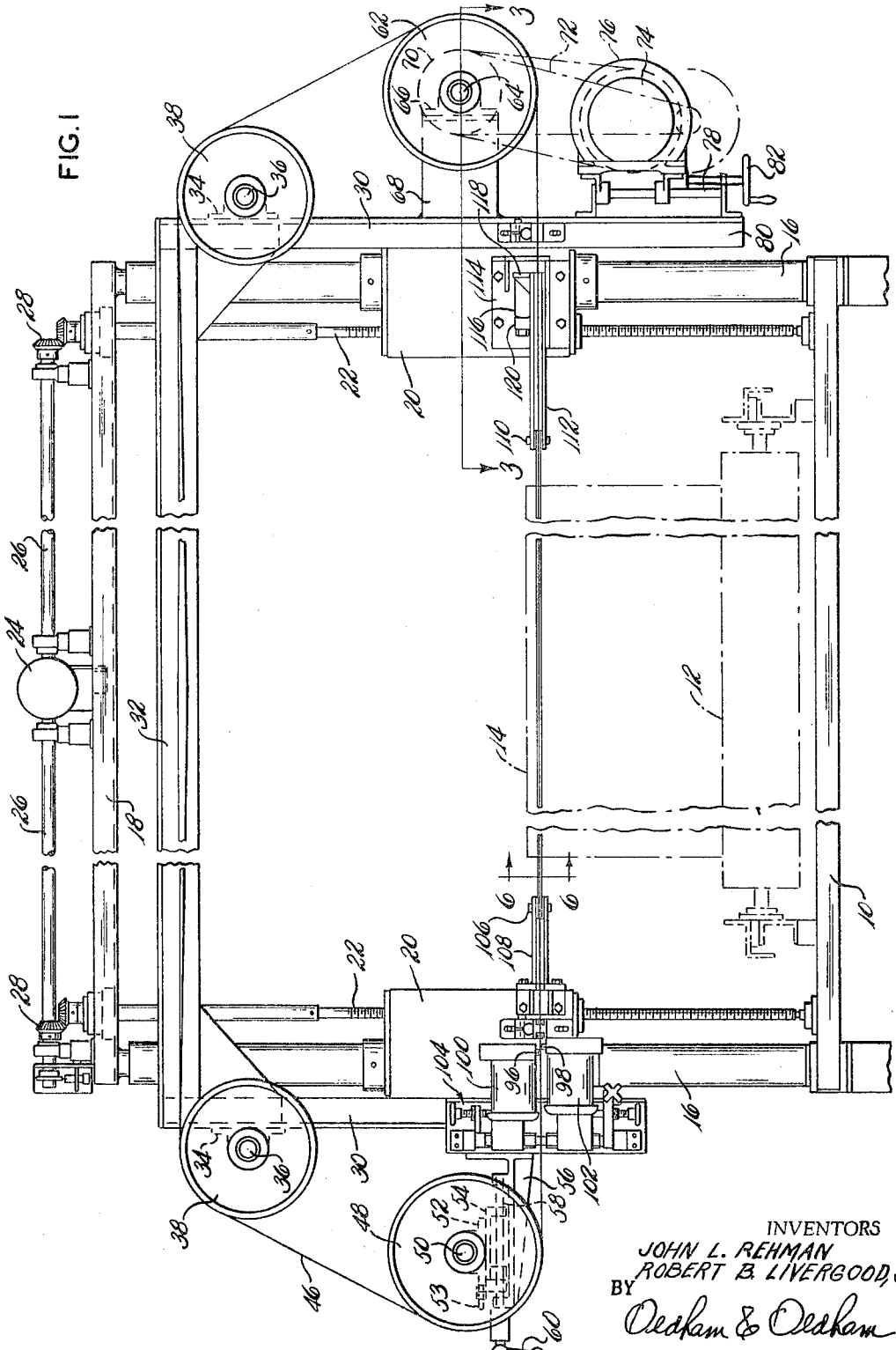

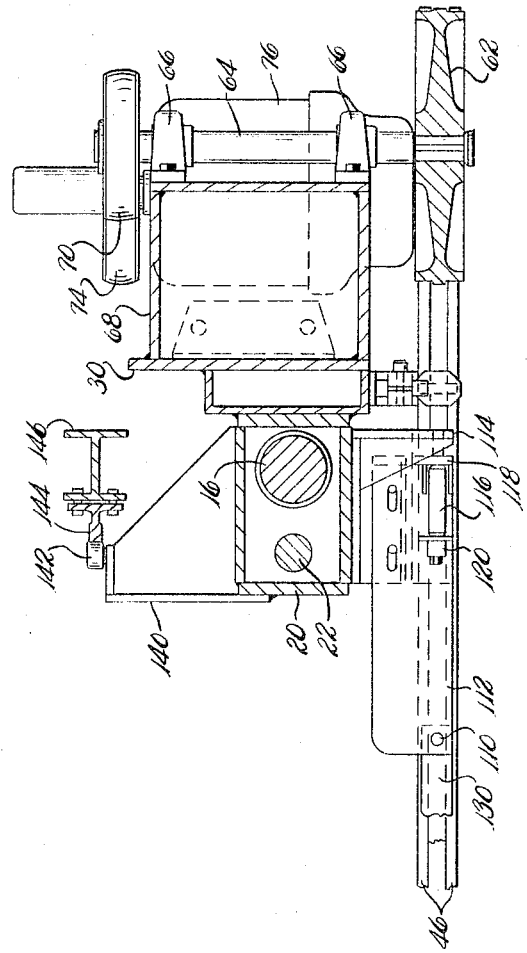

United States Patent Office 3,263,537
Patented August 2, 1966

3,263,537
ENDLESS BAND KNIFE APPARATUS
John L. Rehman, Barberton, and Robert B. Livergood, Jr., Cuyahoga Falls, Ohio, assignors to Falls Engineering & Machine Co., Cuyahoga Falls, Ohio
Filed Apr. 13, 1964, Ser. No. 359,030
9 Claims. (Cl. 83—4)

This invention relates to apparatus for slitting foam material and the like, and, more particularly, is concerned with apparatus of this type utilizing an endless band knife appropriately guided and tensioned for cutting in two directions.

It is the general object of the present invention to provide endless band knife slitting apparatus characterized by accuracy of cutting action over wide dimensional distances, ease of adjustment, simplicity of construction, low initial cost and low maintenance costs, and high speed of operation.

Another object of the invention is to provide slitting apparatus of the character described wherein the endless cutting blade is rigidly supported during the cutting operation so that flat, even, and accurate cuts are made without the cutting blade drifting off of the proper line during the cutting operation.

Another object of the invention is to provide endless band knife cutting apparatus capable of cutting material passed to the apparatus from either one side or the other thereof.

Another object of the invention is the provision of slitting apparatus for counteracting bending of the apparatus in use, so that more accurate cutting operations can be performed.

Another object of the invention is to provide slitting apparatus capable of cutting in opposite directions but utilizing a single endless length of flexible band knife turned into a pair of cutting loops, and so that tensioning of the band knife and sharpening thereof are notably simplified.

The foregoing objects of the invention, and other objects which will become apparent as the description proceeds, are achieved by the provision of endless band knife apparatus including a base, a pair of posts secured to the base and extending vertically therefrom in laterally spaced relation, a box vertically slidable on each post, screw means for simultaneously moving each box vertically of its post, an endless flexible band knife having a cutting edge at one side, a thin knife guide means extending between the boxes, means for applying a high tension to the guide means, rotatable means on each box supporting the band knife in two separate loops one edge of each loop being guided in the guide means but with the cutting edges extending in the opposite directions, means tensioning the band knife, means driving the band knife, an outrigger means carried by each box, a curved beam mounted substantially parallel with each post and engaged by the outrigger for holding the box against turning even though the posts may bend under the tensioning of the knife guide means, and means for adjusting the curve of the beam.

For a better understanding of the invention reference should be had to the accompanying drawings, wherein:

FIGURE 1 is a front elevation of a typical apparatus incorporating the principles of the invention;

FIGURE 2 is an end elevation of the apparatus shown in FIGURE 1;

FIGURE 3 is a sectional view taken on line 3—3 of FIGURE 1 and illustrating certain parts of the apparatus in plan view;

Figure 4:
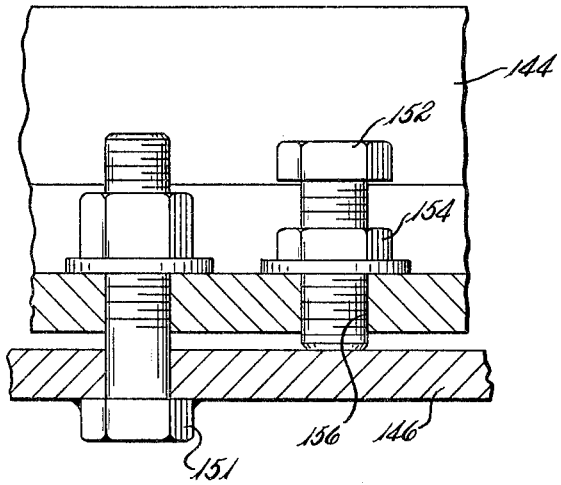
FIGURE 4 is a fragmentary view showing the manner of adjustably supporting the curved cam bar or beam serving to compensate for any bending of the posts of the apparatus in use.

In the drawings, the numeral 10 indicates a base appropriately supporting a conveyor 12 or slidable table adapted to receive the material to be cut, this being shown in chain dotted lines 14. The base 10 fixedly supports posts 16 in vertically extending parallel position at each side of the base 10, the posts 16 being joined together at their tops by a channel-shaped across beam 18. Slidably mounted on each post 16 is a carriage or box 20, and the vertical positions of the boxes 20 is simultaneously controlled by suitable means such as screws 22 positioned parallel to the posts 16 and adapted to be simultaneously rotated by means of a motor 24 operating through shafts 26 and bevel gears 28 to drive the screws 22.

The boxes 20 have vertically extending channel plates 30 secured thereto, these plates 30 being joined together at their upper ends by means of a beam member such as an angle iron 32. Each plate 30 rotatably supports towards its upper end in pillow blocks 34 a short horizontal shaft 36 on which is fixed a pulley 38 having a central rib 40 and a pair of band knife receiving shoulders 42 and 44, the pulleys 38 lying in the same plane at either side of the apparatus, as best seen in FIGURE 1.

Completing the support of the band knife 46 is a tensioning pulley 48 of a construction similar to the pulleys 38, the pulley 48, being positioned in the same plane as the pulleys 38 but mounted below the pulley 38 and to the lateral outside of the pulley 38 on the left hand side of the apparatus as viewed from the position of FIGURE 1. The pulley 48 is fixed on a shaft 50 journalled in pillow blocks 52 slidably secured on a slide 54 in turn adjustably carried on a bracket 56 secured to the lower end of the plate 30. A screw 58 operated by a crank 60 adjustably controls the position of the slide 54 on the bracket 56 to thereby apply a controlled tension to the band knife 46. The pillow blocks 52 are held against sliding movement on the slide 54 by compression spring means 53, these spring means 53 being compressed when the band knife is tensioned by turning crank 60. The spring means 53 accordingly maintain substantially the selection tension on the band knife even though the posts 16 may be bent somewhat under forces imposed on the apparatus when in use.

At the right hand side of the apparatus viewed from the position of FIGURE 1 a fourth pulley 62 is provided in the plane of the pulley 62 being fixed on a shaft 64 journalled in pillow blocks 66 mounted upon a bracket 68 secured to the lower end of the right hand plate 30. The end of the shaft 64 remote from the pulley 62 has an adjustable diameter pulley 70 affixed thereto, the pulley 70 being driven by a belt 72 from an adjustable diameter pulley 74 mounted upon a shaft of a motor 76, the motor 76 being vertically slidable upon a vertical bracket 78 carried upon a downward extension 80 of the right hand plate 30. An adjusting crank 82 operates to change the effective diameter of the drive pulleys 74 and 70 so that the band knife 46 driven from the pulley 62 can be driven through a 4 to 1 speed range.

Figure 5:
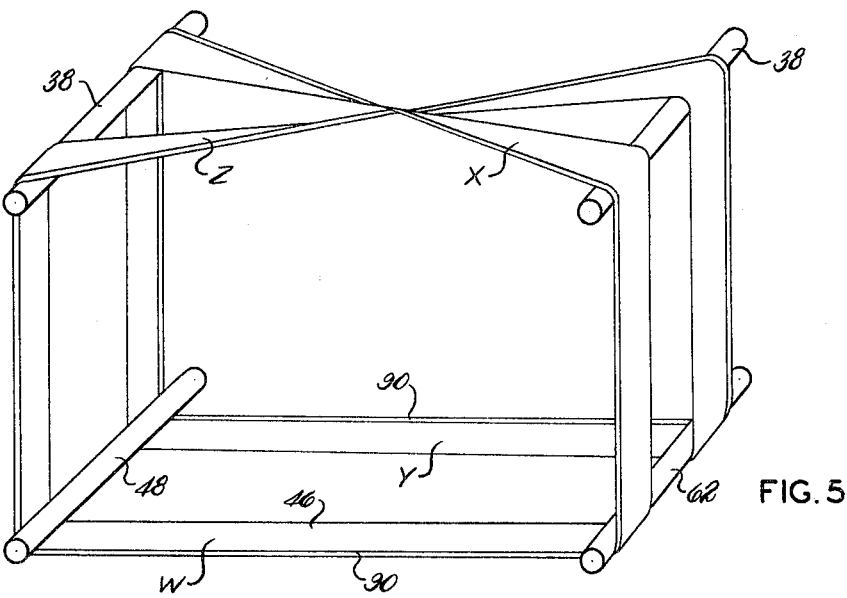
FIGURE 5 is a diagrammatic perspective view showing the two loops made by the endless band knife as utilized in the apparatus.

The manner of mounting the band knife 46 is best illustrated in diagrammatic FIGURE 5. In this figure the cutting edge of the band has been indicated by an additional line 90 indicating the bevel on the cutting edge of the band. Now looking at the lower front stretch or reach of the band, indicated by the letter W, the band being supported in this reach by pulley 48 at the left and by pulley 62 at the right. After passing from the reach W the band knife extends over the front shoulder on right hand pulley 38 to the back shoulder on left hand pulley 38 in the reach marked X, the knife band being turned through 180° in this reach to position the cutting edge towards the rear of the figure. The knife band continues down around the back shoulder of pulley 48 and then extends into the horizontal reach marked Y in the plane of the horizontal reach W, but with the cutting edge 90 directed in the opposite direction from the cutting edge on the reach W. From the horizontal reach Y the endless knife extends over the back shoulder of the right hand pulley 38 and then through the reach Z to the front shoulder on the left hand pulley 38, the knife band being turned through 180° during its travel in the reach Z. The knife band now passes to the front shoulder on pulley 48 and returns to the horizontal reach W with the cutting edge 90 again positioned towards the front of FIGURE 5.

In the manner described a single endless band knife 46 is mounted so that the horizontal reaches W and Y of the band knife are provided both in the same plane, but with the cutting edge of the knife extending in opposite directions whereby material can be cut by the horizontal reaches W and Y whether the material is moved in one direction into the knife blade or in the opposite direction. This is particularly advantageous in the cutting of foam material 14 which is moved to and from the horizontal reaches of the cutting blade on the conveyor 12 and so that a cut can be made upon the material 14 both when it is moved longitudinally on the convey 12 in one direction or longitudinally on the conveyor 12 in the opposite direction. Of course, after one cut has been made on the material 14 moving in one direction it is necessary to move the boxes 20 downwardly the desired distance by the operation of the motor 24 prior to making the return cut on the material. The single tensioning pulley 48 tensions both horizontal reaches W and Y of the band knife, and the driving of both the horizontal reaches of the band knife is effected by the single driving pulley 62, all as will be understood.

Mechanism for sharpening the band knife 46 is illustrated in the apparatus described, and this can be achieved by grinding wheels 96 and 98 respectively mounted above and below the bevel or cutting edge 90 of the band knife 46, the grinding wheels being appropriately mounted upon the shafts of motors 100 and 102 which are adjustably carried in appropriate mechanism indicated as a whole by a numeral 104 on the lower end of the left hand plate 30.

Figure 6:
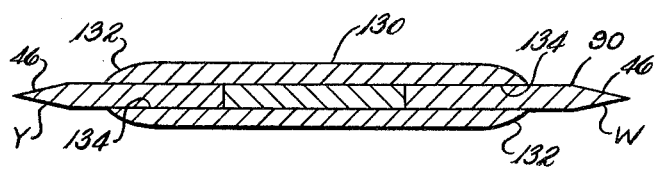
FIGURE 6 is an enlarged cross sectional view taken on line 6—6 of FIGURE 1 and the band knife and support guide.

An important part of the invention is the provision of a guide support for the horizontal reaches W and Y of the endless band knife 46. This guide support, as best seen in FIGURE 6 constitutes a flat high strength steel band, usually made in three parts, identified by the numeral 130, and having tapered side edges 132, each of the side edges being provided with a groove 134 for slidably receiving the reaches W and Y of the band 46. The band knife guide 130 is secured at one end by bolt 106 to a forked bracket 108 fastened to the lower end of the left hand box 20. At the other end of the brand knife guide 100 it is secured by a bolt 110 to a forked bracket 112 which is slidably mounted in a bracket 114 secured to the lower end of the right hand box 20.

A hydraulic cylinder 116 is positioned between a shoulder 118 on the bracket 112 and a stop 120 on the support bracket 114 so that when pressure is applied to the hydraulic cylinder 116 the bracket 112 slides in the support bracket 114 to apply a strong longitudinal tension to the band knife guide 130. The relatively high tensile forces applied to the band knife guide 130, for example, 3,000 to 3,500 lbs. in a typical installation, hold the band knife guide 130 and the band knife 46 very flat and straight during the material slitting operations, prevent the band knives from straying out of line during the cut, and effect very accurate cutting operations. In addition to the tensioning of the band knife guide 130, in the manner described, the band knife 46 is tensioned by the adjustment of the crank 60. In a typical installation the longitudinal tension on the band knife may be in the neighborhood of 500 lbs. Lubrication will be provided, of course, between the band knife guide 130 and the band knife itself.

The tensioning of the band knife guide 130 and the tensioning of the band knife puts a bending moment on the posts 16 and additionally tends to twist the boxes 20 in a horizontal angular plane about the posts 16, the amount of the bending or bowing of the posts 16 and the twisting of the boxes 20 being determined by the vertical position of the boxes 20 on the posts. As the boxes move down towards the lower portion of the posts there is less bending and twisting, but as they move up to the middle position on the posts the bending and twisting approaches a maximum and as the boxes move on up towards the upper end of their travel on the posts the bending and twisting is less pronounced.

The invention provides mechanism for compensating for the bending and twisting forces described, particularly the twisting forces. This is achieved as best seen in FIGURES 3 and 4. Each box 20 is provided with a horizontally and rearwardly extending outrigger bracket 140 rotatably supporting a roller 142. The roller 142 rotatably engages with a curved beam or cam track 144 adjustably mounted in a vertically extending direction upon a vertically positioned I-beam 146 secured at its bottom to a plate 148 extending laterally from the base 10 and secured at its top to a plate 150 extending laterally from the cross beam 18.

As seen in FIGURE 4 the curved beam 144 has a T-shape in cross section and is adjustably secured by bolts 151 to the flange of the I-beam 146 at spaced points along its length. In addition, cap screws 152 carrying lock nuts 154 are threaded through tapped holes 156 in the cross flange of the curved beam 144 and engage with the I-beam 146, these adjusting screws being provided at vertically spaced points so that the curvature of the beam 144 can be adjusted to engage with the roller 142 and hold the boxes 20 against horizontal twisting movement regardless of the vertical height of the boxes 20 on the posts 16 and the particular bend created in the posts 16 by the tension on the knife blade and on the knife blade guide 130. Holding the boxes 20 in the manner described against horizontal twisting movement insures the true running of the knife blade, holds all of the knife blade pulleys in a true flat plane and enhances the proper operation of the slitting apparatus.

Regardless of the bending of the posts 16 the tension on the knife blade guide 130 is maintained constant under the action of the hydraulic cylinder 116, and irrespective of the position of the boxes 20 vertically on the posts 16. Additionally, the tension on the knife blade 46 is likewise maintained susbtantially constant regardless of the vertical position of the boxes 20 on the posts 16 by the provision of a spring means 53 between the pillow blocks 52 and the support bracket 54.

It should be noted that the curvature of the beam 144 is adjusted so that this substantially conforms to the curvature of the posts 16 such as occurs in the use of the apparatus.

It is believed that the structure and operation of the apparatus will be understood from the foregoing description. Suffice it to say here that material 14 positioned upon the conveyor 12 is moved in from one direction against the reach W of the band knife to progressively slit a layer of material from the block of material over the full length of the block. Thereafter, the band knife is indexed downwardly by operation of the motor 24 to position the band knife for the next cut and the block of material 14 is moved back against the reach Y of the cutting blade to effect the cutting of a second layer from the block of material. During the cuttting operations described the knife blade guide is held under heavy longitudinal tension to effect a very flat uniform cut over the full width of the material, the cutting knife itself is maintained under a uniform tension, and all parts are held in operative alignment by means of the outrigger bracket 140 and the roller 142 carried thereby engaging with the curved beam 144, and this is true regardless of the vertical position of the cutting blade. Cuts can be made on the material both as the material is advanced and as it is returned on the conveyor 12 thereby enhancing the slitting capacity of the apparatus. The cutting speed of the knife blade 46 can be adjusted by the hand crank 82 between limits of 4 to 1, and the overall tension on the knife blade can be adjusted by hand crank 60. The control of the indexing motor 24 can be made automatic by known mechanism should this be desirable. It should be understood that the bending curvature effect upon the posts 16 in the use of the apparatus are only fractional parts of an inch, but these are sufficient to materially hamper accurate slitting operations. The apparatus of the invention overcomes the effects of the bending of the posts.

While a certain representative embodiment and details have been shown for the purpose of illustrating the invention, it will be apparent to those skilled in this art that various changes and modifications may be made therein without departing from the spirit or scope of the invention.

What is claimed is:

1. Endless band knife apparatus including a base, a pair of posts secured to the base and extending vertically therefrom in laterally spaced relation, a box vertically slidable on each post, screw means for simultaneously moving each box vertically of its post, an endless flexible band knife having a cutting edge at one side, a thin knife means extending between the boxes, hydraulic means for applying a high tension to the guide means, rotatable means on each box supporting the band knife in two separate loops one edge of each loop being guided in the guide means but with the cutting edges extending in the opposite directions, spring means tensioning the band knife, means driving the band knife, an outrigger means carried by each box, a curved beam mounted substantially parallel with each post and engaged by the outrigger for holding the box against turning even though the posts may bend under the tensioning of the knife and knife guide means, and means for adjusting the curvature of the beam to substantially conform it with the bending encountered in the posts.

2. Endless band knife apparatus including a base, a pair of posts secured to the base and extending vertically therefrom in laterally spaced relation, a box vertically slidable on each post, means for simultaneously moving each box vertically of its post, an endless flexible band knife having a cutting edge at one side, a thin knife guide means extending between the boxes, means for applying a high tension to the guide means, rotatable means on each box supporting the band knife in two separate loops one edge of each loop being guided in the guide means but with the cutting edges extending in the opposite directions, means tensioning the band knife, means driving the band knife, an outrigger means carried by each box, and a curved beam mounted substantially parallel with each post and engaged by the outrigger for holding the box against turning even though the posts may bend under the tensioning of the knife and knife guide means.

3. Endless band knife apparatus including a base, a pair of posts secured to the base and extending vertically therefrom in laterally spaced relation, a box vertically slidable on each post, means for simultaneously moving each box vertically of its post, an endless flexible band knife having a cutting edge at one side, a thin knife guide means extending between the boxes, means for applying a high tension to the guide means, rotatable means on each box supporting the band knife in at least one loop having a reach guided in the guide means, means tensioning the band knife, means driving the band knife, an outrigger means carried by each box, and a curved beam mounted substantially parallel with each post and engaged by the outrigger for holding the box against turning even though the posts may bend under the tensioning of the knife and knife guide means.

4. Endless band knife apparatus including a base, a pair of posts secured to the base and extending vertically therefrom in laterally spaced relation, a box vertically slidable on each post, screw means for simultaneously moving each box vertically of its posts, an endless flexible band knife having a cutting edge at one side, a thin knife guide means extending between the boxes, hydraulic means for applying a high tension to the guide means, rotatable means on each box supporting the band knife in two separate loops one edge of each loop being guided in the guide means but with the cutting edges extending in the opposite directions, spring means tensioning the band knife, means driving the band knife, and means holding the boxes against twisting movement in a horizontal plane when the posts bend under the tensioning of the knife guide means.

5. Endless band knife apparatus including a base, a pair of posts secured to the base and extending vertically therefrom in laterally spaced relation, a box vertically slidable on each post, means for simultaneously moving each box vertically of its post, an endless flexible band knife having a cutting edge at one side, a thin knife guide means extending between the boxes, means for applying a high tension to the guide means, rotatable means on each box supporting the band knife in two separate loops one edge of each loop being guided in the guide means but with the cutting edges extending in the opposite directions, means tensioning the band knife, means driving the band knife, and means holding the boxes against twisting movement in a horizontal plane when the posts bend under the tensioning of the knife guide means.

6. Slitting apparatus including an endless band knife having a single cutting edge, double shouldered pulley means supporting the band knife in two loops, one loop in front of the other, the front loop having a cutting reach with the cutting edge of the knife extending forwardly, the band knife extending from the front loop to the back loop and being twisted through 180° in so doing, the back loop having a cutting reach in the same plane as the cutting reach of the front loop but with the cutting edge of the blade extending in the opposite direction, the band knife extending from the back loop to the front loop and being twisted through 180° in so doing, a tensioned blade guide for supporting the cutting reaches of the band knife, means for moving the pulley means for tensioning the band knife, and means for driving the pulley means to drive the band knife.

7. Slitting apparatus including an endless band knife having a single cutting edge, pulley means supporting the band knife in two loops, one loop in front of the other, the front loop having a cutting reach with the cutting edge of the knife extending forwardly, the band knife extending from the front loop to the back loop and being twisted through 180° in so doing, the back loop having a cutting reach in the same plane as the cutting reach of the front loop but with the cutting edge of the blade extending in the opposite direction, the band knife extending from the back loop to the front loop and being twisted through 180° in so doing, means for tensioning the band knife, and means for driving the band knife.

8. Slitting apparatus including parallel spaced apart posts, carriages mounted on the posts for movement thereon, means for simultaneously moving the carriages, an endless band knife, means on the carriages for supporting the knife to have a cutting reach extending between the carriages, blade guide means supporting the blade in the cutting reach, means for tensioning the blade guide means, curved beam means mounted parallel to each post, an outrigger carried by each carriage and engaging with the curved beam means to hold the carriage against twisting movement even though the posts are bent by the tension on the blade guide means, and means for adjusting the curvature of the beam means to the bending curvature of the posts.

9. Slitting apparatus including parallel spaced apart posts, carriages mounted on the posts for movement thereon, means for simultaneously moving the carriages, an endless band knife, means on the carriages for supporting the knife to have a cutting reach extending between the carriages, blade guide means supporting the blade in the cutting reach, means for tensioning the blade guide means, and means to hold the carriage against twisting movement even though the posts are bent by the tension on the blade guide means.

No references cited.

WILLIAM S. LAWSON, *Primary Examiner.*